I. GILLEN.
AUTOMATIC SHUT-OFF CONDUIT.
APPLICATION FILED APR. 25, 1911.

1,034,009.

Patented July 30, 1912.
2 SHEETS—SHEET 1.

WITNESSES

INVENTOR
Isabella Gillen
BY
ATTORNEYS

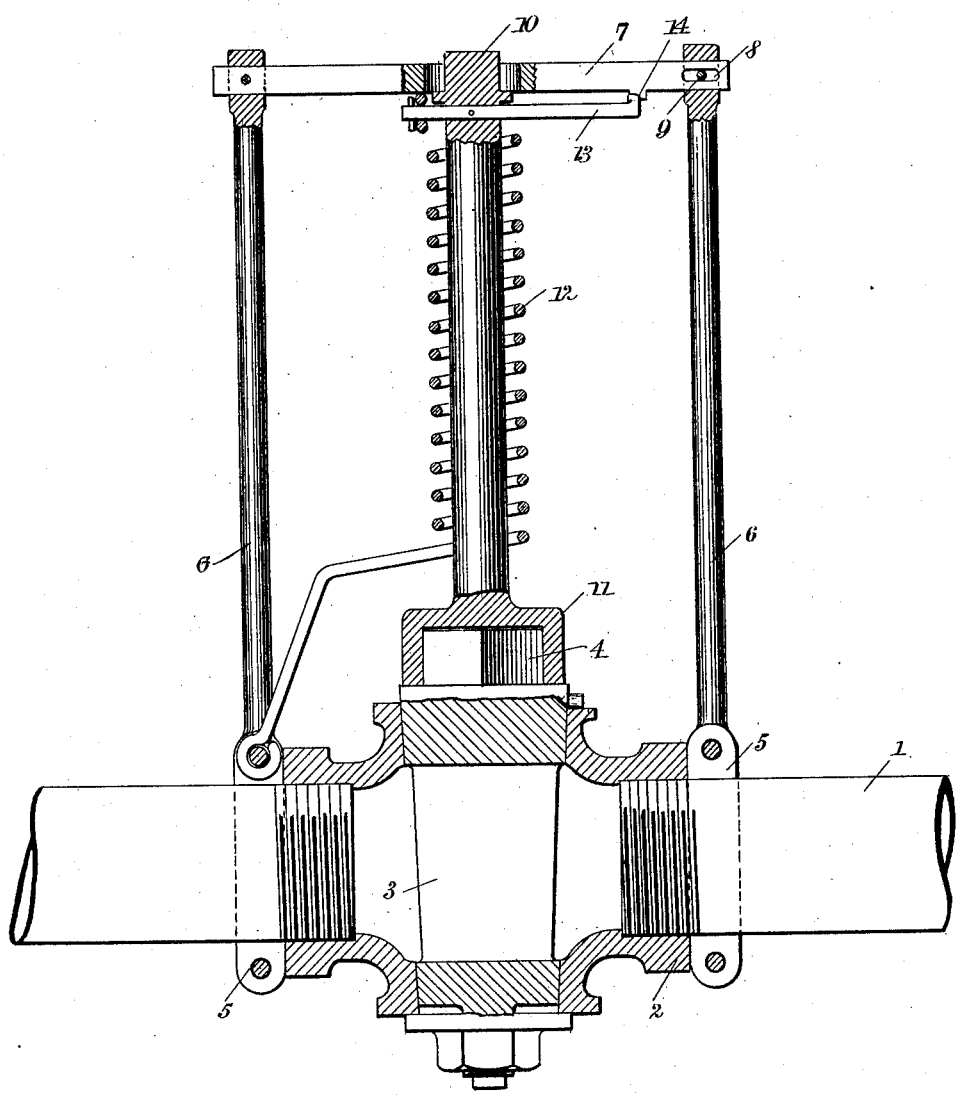

UNITED STATES PATENT OFFICE.

ISABELLA GILLEN, OF NEW YORK, N. Y.

AUTOMATIC-SHUT-OFF CONDUIT.

1,034,009.  Specification of Letters Patent.  Patented July 30, 1912.

Application filed April 25, 1911. Serial No. 623,197.

*To all whom it may concern:*

Be it known that I, ISABELLA GILLEN, a citizen of the United States, and a resident of the city of New York, Rockaway Beach, borough of Queens, in the county of Queens and State of New York, have invented a new and Improved Automatic-Shut-Off Conduit, of which the following is a full, clear, and exact description.

My invention is an automatic shut-off for conduits, such as gas pipes and water pipes, and is designed to operate a valve to close said pipe in case of fire, to prevent the contents of said pipe or conduit from escaping, in case the pipes inside of the house or building communicating with the conduit should be broken or otherwise damaged.

Reference is to be had to the accompanying drawings forming a part of this specification, in which the same characters of reference indicate the same parts in all the views.

Figure 1:
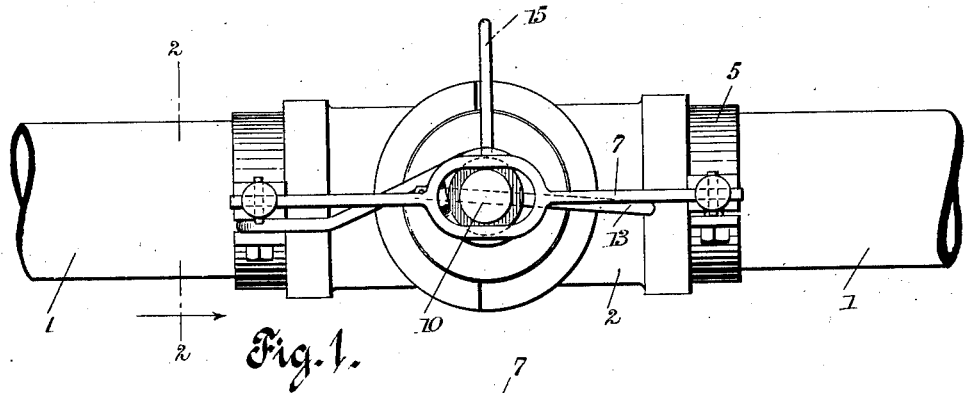
Figure 2:
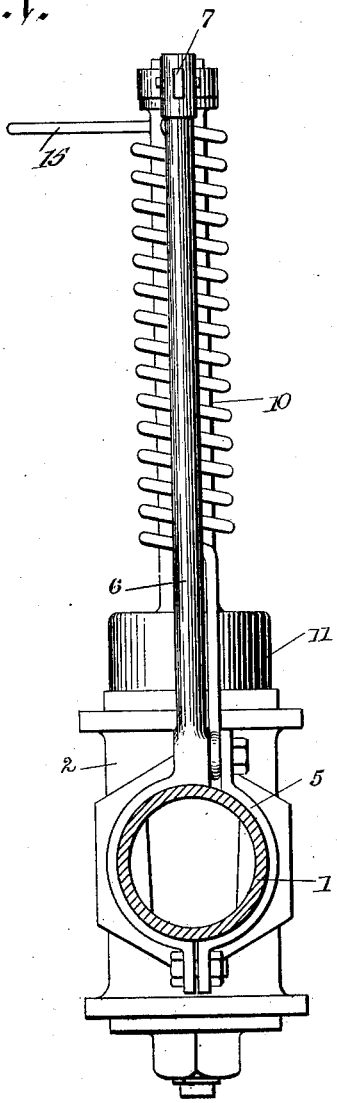

Figure 1 is a top plan of my improved shut-off device; Fig. 2 is a section on the line 2—2 of Fig. 1; and Fig. 3 is a vertical longitudinal sectional view of my improved shut-off device.

On the drawings, 1 is a conduit comprising a joint 2, in which is located a plug valve 3, having a squared end 4, to turn the same to close the conduit 1. 5 are clamps surrounding the conduit at either end of the joint or coupling 2; and 6 are bars or rods which are securely held by said clamps 5 in any desired position. At the outer ends of these rods 6 is carried an expansible bar 7, having a slot 8 in one of its ends, to allow for the expansion of the bar, the ends of the bar passing through the apertures in the ends of the rods 6, and being engaged by transverse pins 9 to keep the bar from being disengaged from the rods 6. Intermediate the length of the rod 7 is formed a central aperture, through which passes the upper end of a valve operating member 10, this valve operating member consisting of a stem having a socket 11 formed at its lower end to engage the squared end of the valve 4. The stem of the valve operating member 10 is surrounded by a coil spring 12, one end of this coil spring being fastened to one of the clamps 5, and the other end being fastened to the arm 13, which passes through the stem of the valve operating member 10, or is made rigid therewith in any other suitable way.

This arm 13 is normally held in position to keep the valve 3 open, and to this end a lug 14 is formed on the lower side of the expansible bar 7 to engage the end of the arm 13. The spring 12 is of course under tension and exerts a force to swing the arm 13 and the valve operating member 10 to close the valve 3 when the arm 13 is released. In addition to the valve operating member 10, a suitable arm, shown at 15, on Fig. 1, may be employed to operate the valve to open position against the force of the spring 12.

In practice, the valve 3 will be located preferably at the point where the pipes enter the building, and the rods 6 may be extended to any point within the structure where it is necessary to locate the bar 7. For example, if the valve 3 be located in the cellar, the bars 6 would be extended up through the flooring into one of the rooms of the building; and in case of fire, the expansion of the bar 7 would move the lug 14 away from the end of the arm 13 and allow the valve operating member 10 to close the valve 3. This would shut off the water or gas and prevent the escape thereof in case the pipes in the building should be broken or damaged in case the structure is destroyed by the flames. The lug 14 may be formed of fusible metal, attached in any desired manner to the bottom of the bar 7. In such a case, if the bar 7 does not expand to a sufficient extent to release the arm 13, the metal 14 will melt and allow the spring 12 to shut the valve 13.

My invention is especially useful to prevent explosions from escaping gas, should the gas pipes of the building be damaged after the outbreak of a fire.

Having thus described my invention, I claim as new and desire to secure by Letters Patent:

1. In a device of the kind described, the combination of a conduit, a valve therefor, a valve-closing member engaging said valve, a spring engaging the said member tending to turn the same to close said valve, and a stationary expansion member, said expansion member and said valve-closing member carrying mutually-engaging means, whereby the valve will be held open against the force of the spring, said expansion member on the outbreak of a fire serving to move the means carried thereby out of engagement with the means carried by the valve-closing member, to permit the spring to move the valve to closed position.

2. In a device of the kind described, the combination of a conduit, a valve therefor, a valve closing member engaging said valve, a spring engaging the said member tending to turn the same to close the said valve, said valve-closing member including an arm, and a stationary expansion bar having a downward projecting lug normally engaging the said arm, said expansion bar upon the outbreak of a fire serving to move said lug out of engagement with said arm to permit the valve to be moved to closed position.

3. In a device of the kind described, the combination of a conduit, a valve therefor for opening and closing the same, a member engaging said valve for turning the same, a spring for actuating said member, said member including an arm, and a stationary expansion bar having a down-turned lug to engage the end of said arm, said lug being formed of fusible metal, whereby upon the outbreak of a fire the said bar will be expanded and the lug melted to release the arm to permit the spring to close the valve.

4. In a device of the kind described, the combination of a conduit, a valve therein, clamps engaging the conduit adjacent the valve, rods secured to said conduit by said clamps, a valve closing member having a socket engaging said valve, a spring surrounding said valve closing member tending to turn the same, an arm carried by said valve closing member and engaged by said spring, and an expansion bar having pin and slot engagement with one of said rods, and having a downward projecting lug to engage said arm, whereby upon the outbreak of a fire the expansion of said bar will move the lug away from said arm and release the same to permit the spring to close the valve.

5. In a device of the kind described, the combination of a conduit, a valve therefor, a valve-closing member engaging said valve, a spring engaging the said member tending to move the same to close said valve, and a stationary expansion member, said expansion member and said valve-closing member carrying mutually-engaging means, whereby the valve will be held open against the force of the spring, said expansion member on the outbreak of a fire serving to move the means carried thereby out of engagement with the means carried by the valve-closing member, to permit the spring to move the valve to closed position.

6. In a device of the kind described, the combination of a conduit, a valve for closing the same, spring means tending to move said valve to closed position, a stationary expansion member and means associated therewith for holding said valve in open position against the action of said spring means, said expansion member on the outbreak of a fire serving to move said means out of engagement with the valve to permit said spring means to move the valve to closed position.

In testimony whereof I have signed my name to this specification in the presence of two subscribing witnesses.

ISABELLA GILLEN.

Witnesses:
HENRY W. NATHONS,
DANIEL A. GILLEN.

Copies of this patent may be obtained for five cents each, by addressing the "Commissioner of Patents, Washington, D. C."